(12) United States Patent
Zhang et al.

(10) Patent No.: US 9,065,758 B2
(45) Date of Patent: Jun. 23, 2015

(54) RING NETWORK PROTECTION METHOD, NETWORK NODE AND RING NETWORK

(71) Applicant: Huawei Technologies Co., Ltd., Shenzhen (CN)

(72) Inventors: Haiyan Zhang, Shenzhen (CN); Hao Long, Chengdu (CN)

(73) Assignee: Huawei Technologies Co., Ltd., Shenzhen (CH)

( * ) Notice: Subject to any disclaimer, the term of this patent is extended or adjusted under 35 U.S.C. 154(b) by 0 days.

(21) Appl. No.: 14/306,971

(22) Filed: Jun. 17, 2014

(65) Prior Publication Data

US 2014/0293775 A1 Oct. 2, 2014

Related U.S. Application Data

(60) Division of application No. 13/285,561, filed on Oct. 31, 2011, now Pat. No. 8,830,824, which is a continuation of application No. PCT/CN2010/071812, filed on Apr. 16, 2010.

(30) Foreign Application Priority Data

Apr. 29, 2009 (CN) .......................... 2009 1 0136240

(51) Int. Cl.
| | |
|---|---|
| H04L 1/00 | (2006.01) |
| H04L 12/26 | (2006.01) |
| H04L 12/707 | (2013.01) |
| H04L 12/437 | (2006.01) |
| H04L 12/24 | (2006.01) |

(52) U.S. Cl.
CPC .............. *H04L 45/22* (2013.01); *H04L 12/437* (2013.01); *H04L 41/0668* (2013.01)

(58) Field of Classification Search
None
See application file for complete search history.

(56) References Cited

U.S. PATENT DOCUMENTS

| | | | |
|---|---|---|---|
| 5,442,620 | A | 8/1995 | Kremer |
| 7,388,828 | B2 | 6/2008 | Nakash |
| 2002/0181392 | A1 | 12/2002 | Okuno |
| 2003/0214962 | A1 | 11/2003 | Allaye-Chan et al. |
| 2003/0233595 | A1 | 12/2003 | Charny et al. |
| 2004/0105453 | A1 | 6/2004 | Shpak et al. |

(Continued)

FOREIGN PATENT DOCUMENTS

| | | |
|---|---|---|
| CN | 1371188 A | 9/2002 |
| CN | 1620055 A | 5/2005 |
| CN | 1801768 A | 7/2006 |
| EP | 0744845 A2 | 11/1996 |
| WO | 2005008392 A2 | 1/2005 |

OTHER PUBLICATIONS

Charny, Anna, et al., "Distinguish a Link from a Node Failure Using RSVP Hellos Extensions," IETF Internet Draft, Oct. 2002, 12 pages.

(Continued)

*Primary Examiner* — Chi H Pham
*Assistant Examiner* — Soon-Dong D Hyun
(74) *Attorney, Agent, or Firm* — Slater & Matsil, L.L.P.

(57) ABSTRACT

A ring network protection method is disclosed. When a fault occurs in a ring network, a first node selects a protection tunnel according to a fault condition of a pre-established protection tunnel. Services are switched to the selected protection tunnel. A protection switching request is sent on the selected protection tunnel and another end node is informed of the selected protection tunnel to switch the services to the selected protection tunnel.

13 Claims, 4 Drawing Sheets

(56) References Cited

U.S. PATENT DOCUMENTS

| | | | |
|---|---|---|---|
| 2004/0109687 A1 | 6/2004 | Park et al. | |
| 2004/0184403 A1 | 9/2004 | Ohira et al. | |
| 2005/0071484 A1* | 3/2005 | Kang et al. | 709/230 |
| 2005/0111350 A1 | 5/2005 | Kano | |
| 2006/0164976 A1* | 7/2006 | Grover et al. | 370/228 |
| 2006/0209860 A1* | 9/2006 | Miyazaki et al. | 370/406 |
| 2008/0107416 A1 | 5/2008 | Wang | |
| 2008/0219152 A1 | 9/2008 | Umansky et al. | |
| 2008/0232802 A1* | 9/2008 | Wang | 398/59 |
| 2008/0285440 A1 | 11/2008 | Adler | |
| 2009/0010257 A1* | 1/2009 | Chaudhry et al. | 370/390 |
| 2009/0252030 A1* | 10/2009 | Kashyap et al. | 370/216 |
| 2009/0262651 A1* | 10/2009 | Liu | 370/242 |
| 2012/0300617 A1* | 11/2012 | Ao | 370/218 |

OTHER PUBLICATIONS

European Telecommunication Standard, "Transmission and Multiplexing (TM); Synchronous Digital Hierarchy (SDH); Network Protection Schemes; Automatic Protection Switch (APS) Protocols and Operation," ETS 300 746, Feb. 1997, 66 pages.

Helvoort, Huub van, et al., "Draft ITU-T Rec. G.8132/Y.1382 (T-MPLS Shared Protection Ring)," International Telecommunication Union, Study Group 15, TD 501 (PLEN/15), Feb. 11-22, 2008, 36 pages.

International Telecommunication Union, "Types and Characteristics of SDH Network Protection Architectures," ITU-T Recommendation G.841, Oct. 1998, 50 pages.

Metro Ethernet Forum Technical Committee, "Metro Ethernet Protection," MEF Technical Committee, Transport and Protocols, Oct. 23-25, 2001, 28 pages.

Pan, P., et al., "Fast Reroute Extensions to RSVP-TE for LSP Tunnels," Network Working Group, Request for Comments: 4090, May 2005, 38 pages.

Vasseur, Jean-Philippe, et al, "MPLS Traffic Engineering Fast Reroute: Bypass Tunnel Path Computation for Bandwidth Protection," IETF Internet Draft, Feb. 2003, 53 pages.

Yang, J. et al., "Multiprotocol Label Switching Transport Profile Ring Protection Analysis," MPLS Working Group, Internet-Draft, Oct. 27, 2008, 12 pages.

* cited by examiner

RING NETWORK PROTECTION METHOD, NETWORK NODE AND RING NETWORK

CROSS-REFERENCE TO RELATED APPLICATIONS

This is a divisional of U.S. patent application Ser. No. 13/285,561, filed on Oct. 31, 2011 (now U.S. Pat. No. 8,830,824), which is a continuation of International Application No. PCT/CN2010/071812, filed on Apr. 16, 2010, which claims priority to Chinese Patent Application No. 200910136240.3, filed on Apr. 29, 2009. This is also related to U.S. patent application Ser. No. 14/306,996 which is also a divisional of Ser. No. 13/285,561. The aforementioned patent applications are hereby incorporated by reference in their entireties.

TECHNICAL FIELD

The present invention relates to the field of communications technologies, and in particular, to a ring network protection method, a network node and a ring network.

BACKGROUND

In recent years, packet switching technology fast becomes popular and starts to be used in a transport network of an operator. At present, a Multiple Protocol Label Switch (MPLS) network in the packet switching technology usually uses a mesh topology structure, while the transport network usually uses a ring topology structure due to its deployment features. A conventional transport network, for example, a Synchronized Digital Hierarchy (SDH) network, mostly uses the ring topology networking, and implements fast protection switching of services according to the features of a ring network. In SDH times, the application and demand of the ring are rather common, as proved by actual deployment. After the transition of the transport network from the SDH to a packet switching network, since a fiber deployed in advance still has a ring shape, the ring network technology of the packet switching network still has a wide application prospect.

Currently, in the ring network, a link protection tunnel may be established for each link or a node protection tunnel may be established for each node. However, when only the link protection tunnel is established, the node cannot be protected in the case of a node fault. When only the node protection tunnel is established, as shown in FIG. 1, for example, a node protection tunnel T is established for a node B, normal transmission of the services at the node B cannot be implemented when a fault occurs in the link between the nodes A and B.

SUMMARY

Embodiments of the present invention provide a ring network protection method, a network node and a network system, through which, a protection tunnel can be correctly selected when a link fault or a node fault occurs in the ring network, so as to ensure normal service transmission.

An embodiment of the present invention provides a ring network protection method. A node in the ring network receives a ring network protection switching request when a fault occurs in the ring network. The ring network protection switching request carries information of a source node and a destination node of the ring network protection switching request. A fault location is determined according to the information of the source node and the destination node. A protection tunnel is selected according to the determined fault location. Services are switched to the selected protection tunnel. The selected protection tunnel is a link protection tunnel between the node and the source node, or a node protection tunnel of the destination node on a short way between the node and the source node.

A ring network protection method is further provided. When a fault occurs in a ring network, a first node selects a protection tunnel according to a fault condition of a pre-established protection tunnel and switches services to the selected protection tunnel. A protection switching request is sent on the selected protection tunnel and another end node of the selected protection tunnel is informed to switch the services to the selected protection tunnel.

A ring network protection method is further provided. A first node sends a protection switching request on two protection tunnels when a fault occurs in a ring network. The two protection tunnels comprises a link protection tunnel of a link between the first node and a second node, and a node protection tunnel of the second node respectively when a fault occurs in a ring network. A protection switching response is received on one of the two protection tunnels. Services are switched to the protection tunnel where the protection switching response is received.

A node is located in a ring network. A receiving unit is configured to receive a ring network protection switching request. The ring network protection switching request carries information of a source node and a destination node of the ring network protection switching request. A protection tunnel selection unit is configured to determine a fault location according to the information of the source node and the destination node, and select a protection tunnel according to the determined fault location. The selected protection tunnel is a link protection tunnel of a link between the source node and the node, or a node protection tunnel of the destination node on a short way between the source node and the node.

A node is located in a ring network. A selection unit is configured to select a protection tunnel according to a fault condition of a pre-established protection tunnel. A switching unit is configured to switch services to the selected protection tunnel. A sending unit is configured to send a protection switching request on the selected protection tunnel.

A node is also provided. A sending unit is configured to send a protection switching request on two protection tunnels when a fault occurs in a ring network, wherein the two protection tunnels comprises a link protection tunnel of a link between the node and a second node, and a node protection tunnel of the second node respectively. A receiving unit is configured to receive a protection switching response on one of the two protection tunnels. A switching unit is configured to switch services to the protection tunnel where the protection switching response is received.

A ring network is provided. A first node is configured to detect a network fault, and to send a ring network protection switching request to a second node. The ring network protection switching request carries information of a source and a destination node of the ring network protection switching request message. The second node is configured to determine a fault location according to the information of the source node and the destination node, to select a protection tunnel according to the determined fault location, and to switch services to the selected protection tunnel. The selected protection tunnel is a link protection tunnel of a link between the second node and the first node, if the fault location is between the first node and the second node and the second node is the destination node; or the selected protection tunnel is a node protection tunnel of the destination node on a short way between the second node and the first node, if the fault location is on the destination node and the second node is not the destination node.

A ring network is further provided, which includes a first node, a second node and a third node, where the second node is adjacent to the first node and the third node respectively.

The first node is configured to select a protection tunnel according to a fault condition of a pre-established protection tunnel, switch services to the selected protection tunnel, and send a protection switching request on the selected protection tunnel, where the selected protection tunnel is a link protection tunnel of a link between the first node and the second node or a node protection tunnel of the second node.

The second node is configured to switch the services to the link protection tunnel of the link between the first node and the second node if the protection switching request is received on the link protection tunnel of the link between the first node and the second node.

The third node is configured to switch the services to the node protection tunnel of the second node if the protection switching request is received on the node protection tunnel of the second node.

A ring network is also provided, which includes: a first node, a second node and a third node, where the second node is adjacent to the first node and the third node respectively.

The first node is configured to send a protection switching request on two protection tunnels when a fault occurs in the ring network, wherein the two protection tunnels comprises a link protection tunnel of a link between the first node and the second node, and a node protection tunnel of the second node; receive a protection switching response on on one of the two protection tunnels; and switch services to the protection tunnel where the protection switching response is received.

The second node is configured to switch the services to the link protection tunnel of the link between the first node and the second node if the protection switching request is received on the link protection tunnel of the link between the first node and the second node, and send the protection switching response on the link protection tunnel of the link between the first node and the second node.

The third node is configured to switch the services to the node protection tunnel of the second node, and send the protection switching response on the node protection tunnel of the second node, if the protection switching request is received on the node protection tunnel of the second node, and it is detected that a fault occurs on a short way side between the third node and the first node.

In an embodiment of the present invention, after receiving a ring network protection switching request message, a network node determines fault location of a ring network according to the ring network protection switching request, selects a protection tunnel according to the fault location of the ring network, and switches services to the selected protection tunnel, so as to ensure normal service transmission.

In another embodiment of the present invention, a first node selects a protection tunnel according to a fault condition of a pre-established protection tunnel, and sends a protection switching request on the selected protection tunnel, so that the other end of the protection tunnel learns that services need to be switched to the protection tunnel, so as to ensure normal service transmission.

In another embodiment of the present invention, a first node sends a protection switching request on two protection tunnels (a link protection tunnel of a link between a first node and a second node, and a node protection tunnel of the second node) respectively, and switches services to the protection tunnel where the protection switching response is received, so as to ensure normal service transmission.

DETAILED DESCRIPTION OF ILLUSTRATIVE EMBODIMENTS

Embodiment 1

Embodiment 1 of the present invention provides a ring network protection method, which includes the following.

When a fault occurs in the ring network, a network node receives a ring network protection switching request message sent by a node that detects the fault, where the ring network protection switching request message carries source and destination node information of the ring network protection switching request message.

A fault location is determined according to the source and destination node information, a protection tunnel is selected according to the determined fault location, and services are switched to the selected protection tunnel, where the selected protection tunnel is a link protection tunnel of a link between the network node and a source node, or a node protection tunnel of an intermediate node on a short way between the network node and the source node.

In Embodiment 1 of the present invention, after receiving the ring network protection switching request message, the network node determines the fault location of the ring network according to the received ring network protection switching request message, selects the protection tunnel (the selected protection tunnel is the link protection tunnel of the link between the network node and the source node, or the node protection tunnel of the intermediate node on the short way between the network node and the source node) according to the fault location of the ring network, and switches the services to the selected protection tunnel to ensure normal service transmission.

Figure 1:
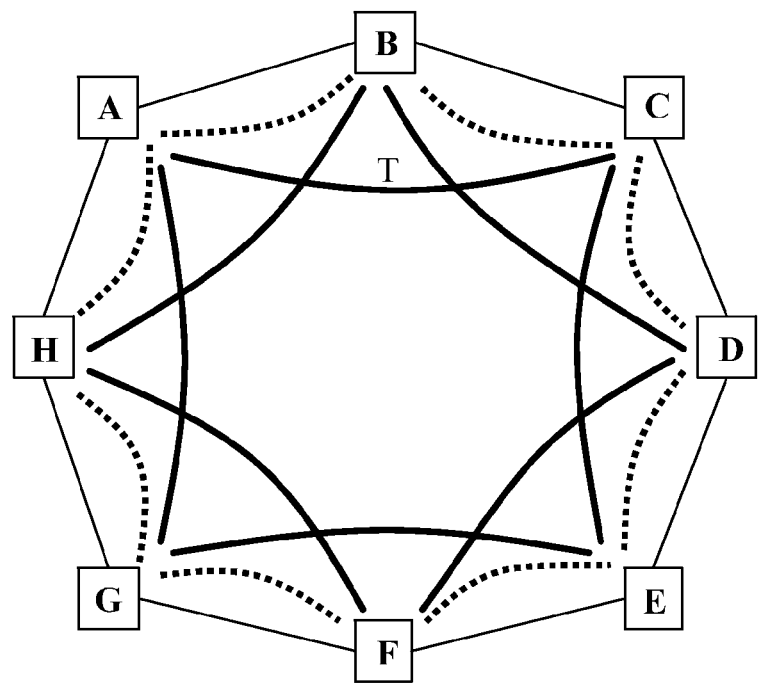
FIG. 1 is a schematic diagram of a protection link in a mesh topology structure in the prior art.
Figure 2:
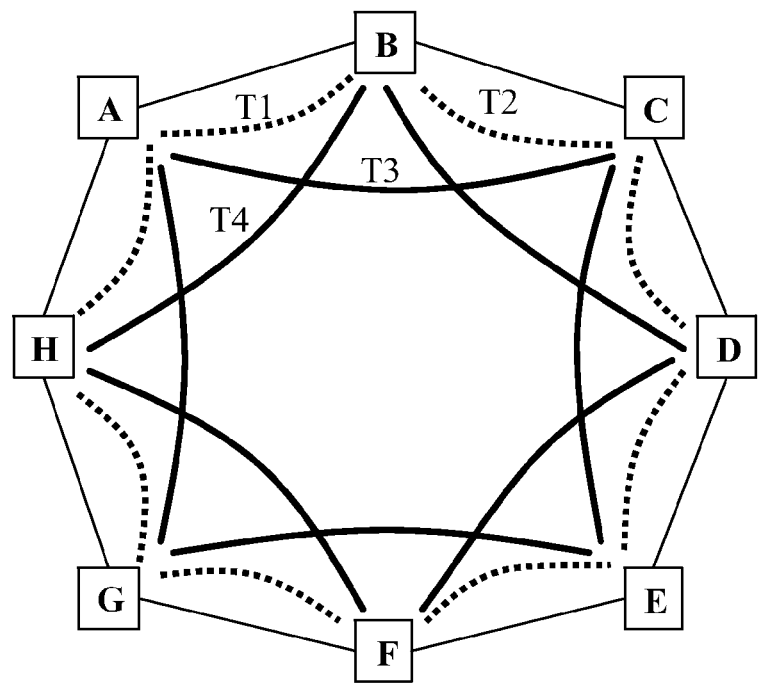
FIG. 2 is a schematic diagram of a protection tunnel according to an embodiment of the present invention.

In order to make Embodiment 1 of the present invention clearer, the protection tunnel, that is, the node protection tunnel, is pre-established for each node in the ring network in Embodiment 1 of the present invention, and the protection tunnel, that is, the link protection tunnel, is established for each link between the adjacent nodes. It is assumed that n nodes exist on one ring, the number of the protection tunnels established in the ring network is as follows: n node protection tunnels+n link protection tunnels=2n protection tunnels. As shown in FIG. 2, for example, it is assumed that 8 nodes A, B, C, D, E, F, G and H exist in the ring network altogether, 16 protection tunnels are established altogether. In FIG. 2, the arc thick dotted line represents the link protection tunnel, and the arc thick solid line represents the node protection tunnel.

The node protection tunnels in Embodiment 1 and the subsequent embodiments have a long way.

Embodiment 2

Figure 3:
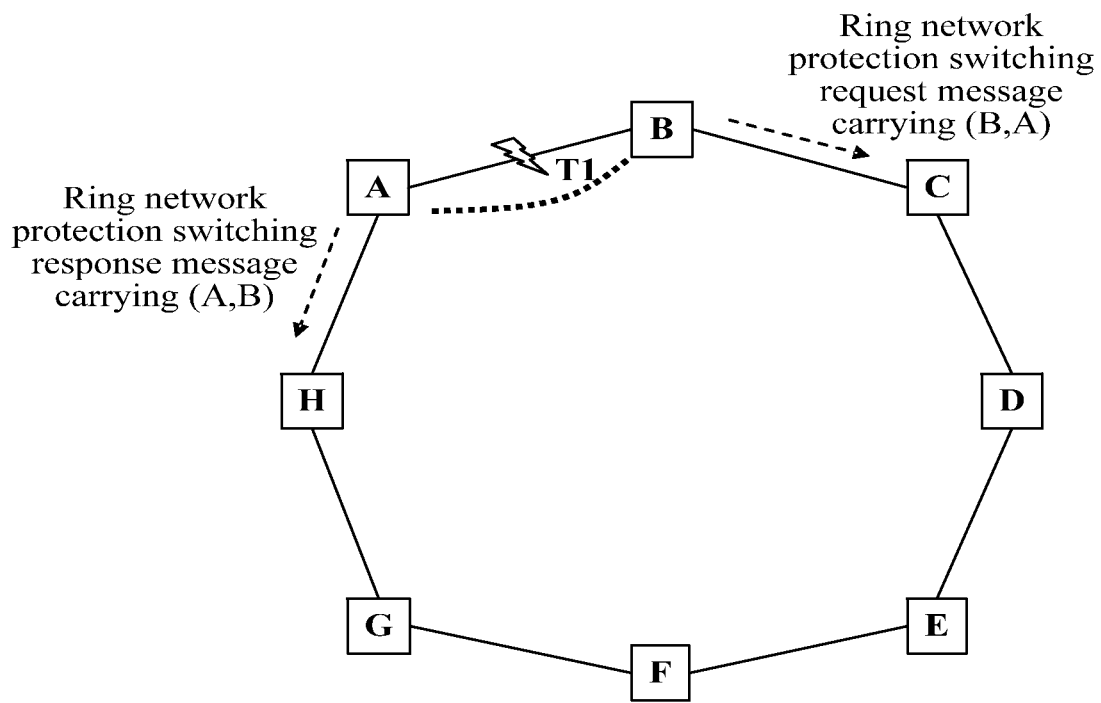
FIG. 3 is a schematic diagram of a ring network protection method according to Embodiment 2 of the present invention.

Referring to FIG. 3, Embodiment 2 of the present invention provides a ring network protection method, which is applicable to the protection from a link fault. In the method, it is assumed that a fault occurs in a unidirectional link from a node A to a node B, and the node B detects the fault and sends a ring network protection switching request message. The method includes the following.

The node B reversely sends the ring network protection switching request message in the ring network, where the message carries source node information and destination node information, that is, (B,A), and the source and destination nodes are respectively the source and destination nodes of the ring network protection switching request message, that is, the source node is the node B and the destination node is a node adjacent to the node B in a direction of detecting the fault at the node B, that is, the node A.

Other nodes in the ring network receive the ring network protection switching request message in sequence, judge whether the other nodes are the destination nodes; if the other nodes are not the destination nodes, judge whether the other nodes detect the fault, and if the other nodes do not detect the fault, transparently transmit the ring network protection switching request message to a next node. In this embodiment, the node B transparently transmits the ring network protection switching request message to the node A through the nodes C, D, E, F, G and H.

After receiving the ring network protection switching request message, the node A determines that the node A is the destination node according to the destination node information in the message, learns the link fault between the node A and the node B according to the topology of the ring network, switches services to the link protection tunnel T1, and sends a ring network protection switching response message in the ring network, where the ring network protection switching response message carries the source and destination node information (A,B).

After the node B receives the ring network protection switching response message, the services are switched to the link protection tunnel T1.

In Embodiment 2 of the present invention, when a fault occurs in the unidirectional link from the node A to the node B, the node B sends the ring network protection switching request message in a reverse direction of the ring network. After receiving the ring network protection switching request message, when determining that the node A is the destination node, the node A switches the services to the link protection tunnel, so as to ensure normal service transmission.

Embodiment 3

Figure 4:
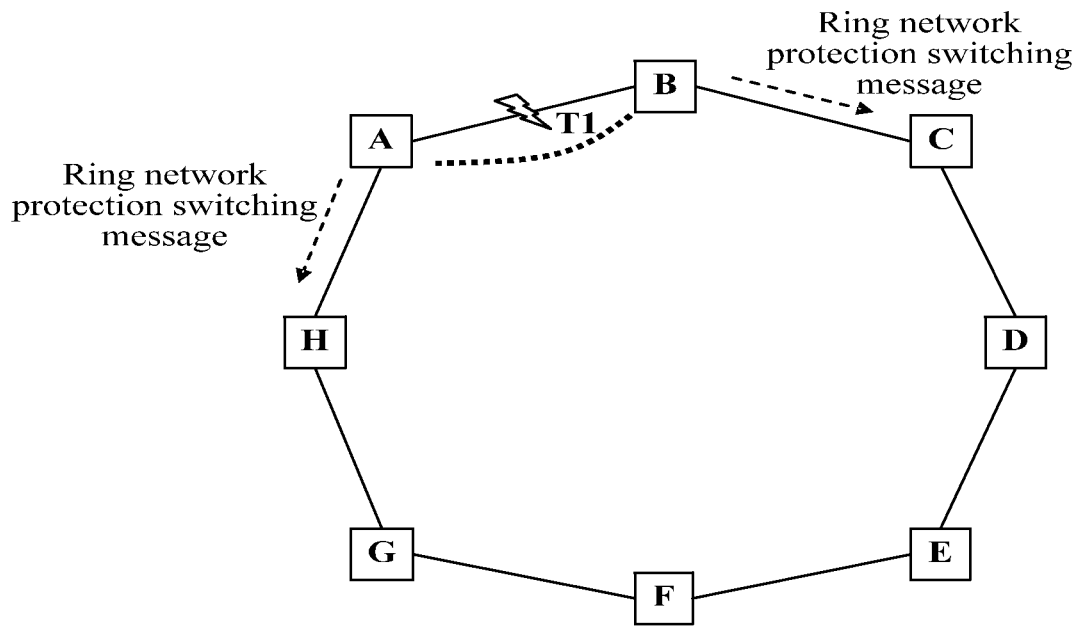
FIG. 4 is a schematic diagram of a ring network protection method according to Embodiment 3 of the present invention.

Referring to FIG. 4, Embodiment 3 of the present invention provides a ring network protection method, which is applicable to the protection from a link fault. In the method, it is assumed that faults occur in bidirectional links between the node A and the node B, both the nodes A and B detect the fault, and the nodes A and B respectively and reversely send a ring network protection switching request message in the ring network. The method specifically includes the following.

The node A and B reversely send the ring network protection switching request message in the ring network. The ring network protection switching request message sent by the node A carries the source and destination node information (A,B), and the ring network protection switching request message sent by the node B carries the source and destination node information (B,A).

The node receiving the ring network protection switching request message judges whether the node is the destination node according to the destination node information in the message; if the node is not the destination node, judges whether the node detects the fault, and if the node does not detect the fault, transparently transmits the ring network protection switching request message to a next node. In this embodiment, the ring network protection switching request message sent by the node A and carrying the source and destination node information (A,B) is transparently transmitted to the node B through the nodes H, G, F, E, D and C in sequence, and the ring network protection switching request message sent by the node B and carrying the source and destination node information (B,A) is transparently transmitted to the node A through the nodes C, D, E, F, G and H in sequence.

The node B determines that the node B is the destination node according to the destination node information in the ring network protection switching request message, learns the link fault between the node A and the node B according to the topology of the ring network, switches services to the link protection tunnel T1 and sends a ring network protection switching response message through the ring network, where the message carries the source and destination node information (B,A). The node A determines the node A is the destination node according to the destination node information in the message, learns the link fault between the node A and the node B according to the topology of the ring network, switches the services to the link protection tunnel T1, and sends the ring network protection switching response message through the ring network, where the message carries the source and destination node information (A,B).

When the nodes A and B respectively receive the ring network protection switching response message, the protection switching is performed for both, and no action is performed.

In Embodiment 3 of the present invention, when the fault occurs in the bidirectional links between the node A and the node B, the node B and the node A respectively send the ring network protection switching request message in the ring network. After receiving the ring network protection switching request message, when determining that the nodes are the destination nodes, the nodes A and B switch the services to the link protection tunnel, so as to ensure normal service transmission.

Embodiment 4

Figure 5:
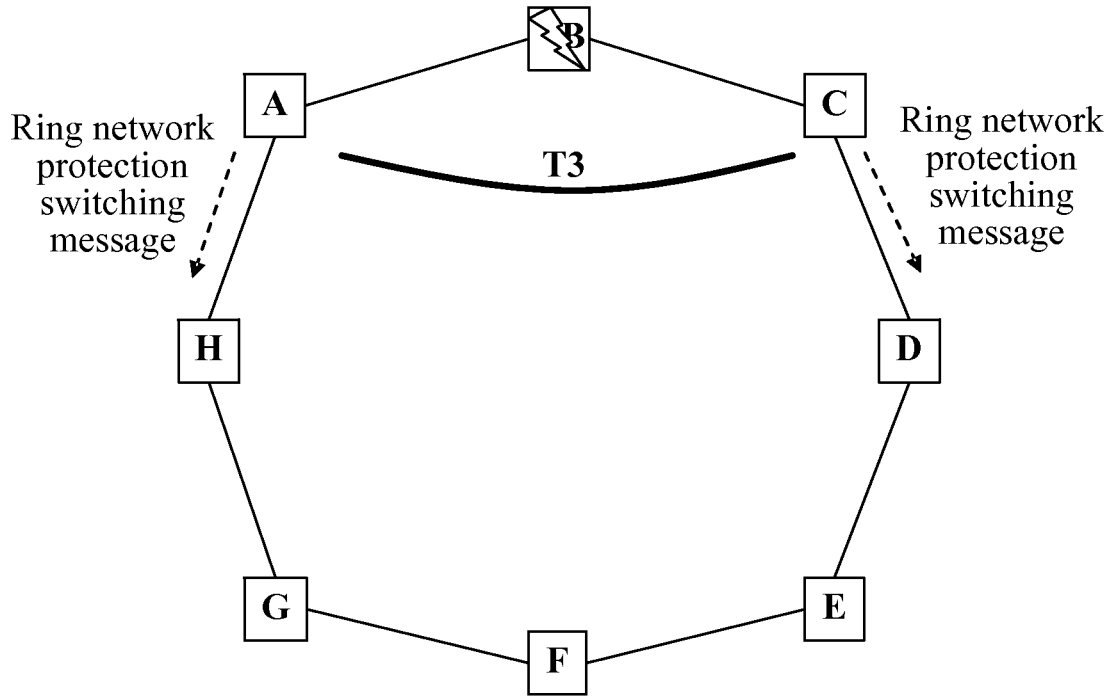
FIG. 5 is a schematic diagram of a ring network protection method according to Embodiment 4 of the present invention.

Referring to FIG. 5, Embodiment 4 of the present invention provides a ring network protection method, which is applicable to the protection from a node fault. In the method, it is assumed that a fault occurs in a node B between a node A and a node C, both the nodes A and C detect the fault, and the nodes A and C respectively and reversely send a ring network protection switching request message in the ring network. The method specifically includes the following.

The nodes A and C reversely send the ring network protection switching request message in the ring network, the ring network protection switching request message sent by the node A carries the source and destination node information (A,B), and the ring network protection switching request message sent by the node C carries the source and destination node information (C,B).

The ring network protection switching request message sent by the node A and carrying the source and destination node information (A,B) is transparently transmitted to the node C through the nodes H, G, F, E and D in sequence, and the ring network protection switching request message sent by the node C and carrying the source and destination node information (C,B) is transparently transmitted to the node A through the nodes D, E, F, G and H in sequence.

The node C determines that the node C is not the destination node according to the destination node information in the ring network protection switching request message, detects a fault on a short way side between the node C and the node B, determines that the fault occurs in the node B according to the source and destination node information and a network topology structure, switches services to a node protection tunnel T3, and sends a protection switching response message through the ring network, where the protection switching response message carries the source and destination node information (C,B). The node A determines that the node A is not the destination node according to the destination node information in the received ring network protection switching request message, detects the fault on the short way side between the node A and the node B, determines that the fault occurs on the node B according to the source and destination node information and the network topology structure, switches the services to the node protection tunnel T3, and sends the protection switching response message through the ring network, where the message carries the source and destination node information (A,B).

When the nodes A and C respectively receive the ring network protection switching response message, the protection switching is performed for both, and no action is performed.

In Embodiment 4 of the present invention, when the fault occurs on the node B between the node A and the node C, the node C and the node A respectively send the ring network protection switching request message in the ring network. After receiving the ring network protection switching request message, when determining that the nodes A and C are not the destination nodes and both detecting the fault, the nodes A and C switch the services to the node protection tunnel, so as to ensure normal service transmission.

In the foregoing embodiments of the present invention, when a fault occurs in a ring network, after a node adjacent to the network fault detects the fault, a corresponding link protection tunnel or node protection tunnel is selected to perform protection switching through a ring network protection switching mechanism. In the following embodiments of the present invention, after the node adjacent to the network fault detects the fault, the corresponding link protection tunnel or node protection tunnel is selected to perform the protection switching through a linear protection switching mechanism.

The fault detection of the node adjacent to the network fault may be implemented through an existing method in a fast reroute mechanism (for example, a link layer protocol, a hello mechanism in a Resource Reservation Protocol (RSVP) defined in the Internet Engineering Task Force (IETF), or may be implemented through a fault detection method of Operation, administration and maintenance (OAM) defined according to International Telecommunication Union-Telecommunication Standardization Sector (ITU-T), which is not described in detail here.

Embodiment 5

Embodiment 5 of the present invention provides a ring network protection method, which includes the following.

A first node selects a protection tunnel according to a fault condition of a pre-established protection tunnel, switches services to the selected protection tunnel, sends a protection switching request message on the selected protection tunnel, and informs another end node of the selected protection tunnel to switch the services to the selected protection tunnel.

A manner of sending the protection switching request message on the selected protection tunnel includes, but is not limited to, the following manner: sending an OAM packet, and a format of the OMA packet is as shown in Table 1:

TABLE 1

| Tunnel Label | LSP Label | OAM PDU |
| --- | --- | --- |

Tunnel Label is a label of the selected protection tunnel, and OAM PDU includes the protection switching request message. Specifically, an intermediate node on the protection tunnel forwards the OAM packet to a next node, and the other end node of the protection tunnel determines, according to the protection switching request message in the OAM packet, to switch the services to the protection tunnel.

In Embodiment 5 of the present invention, the first node selects the protection tunnel for service switching according to the fault condition of the pre-established protection tunnel, switches the services to the selected tunnel, and sends the protection switching request message on the selected protection tunnel so that the other end of the protection tunnel learns that the services need to be switched to the protection tunnel, so as to ensure normal service transmission.

The first node may be the node B in following Embodiment 6, or the node A or the node B in following Embodiment 7, or the node A or the node C in following Embodiment 8.

Embodiment 6

Referring to FIG. 2, Embodiment 6 of the present invention provides a ring network protection method. In the method, it is assumed that a link fault occurs between a node A and a node B, the node B detects the fault, and in the method, the mode B sends a protection switching request message on a protection link. The method includes the following.

The node B detects whether a fault occurs in a link protection tunnel, and if the fault does not occur, selects a link protection tunnel T1 as the protection tunnel of the current service transmission, switches services to the link protection tunnel T1, and sends the protection switching request message on the link protection tunnel T1.

An intermediate node on the link protection tunnel T1 receives the protection switching request message, and forwards the protection switching request message to a next node in the same processing manner as the processing manner after receiving a common data packet or a control protocol.

The node A (the other end node of the link protection tunnel T1) receives the protection switching request message, switches the services to the link protection tunnel T1, and sends a protection switching response message on the link protection tunnel T1. When the node B receives the protection switching response message, the link protection switching is implemented, and no action is performed.

In Embodiment 6 of the present invention, when the fault occurs in a unidirectional link from the node A to the node B, the services are switched to the link protection tunnel, and the protection switching request message is sent on the link protection tunnel so that the other end of the link protection tunnel learns that the services need to be switched to the link protection tunnel, so as to ensure normal service transmission.

Embodiment 7

Referring to FIG. 2, Embodiment 7 of the present invention provides a ring network protection method. In the method, it is assumed that faults occur in bidirectional links between a node A and a node B, both the node A and the node B detect the faults in the ring network, and the nodes A and B respectively send a protection switching request message on a link protection link. The method includes the following.

The node B does not detect the fault on the link protection tunnel, selects a link protection tunnel T1 as the protection tunnel of the current service transmission, switches services to the link protection tunnel T1, and sends the protection switching request message on the link protection tunnel T1. The node A does not detect the fault on the link protection tunnel, selects the link protection tunnel T1 as the protection tunnel of the current service transmission, switches the services to the link protection tunnel T1, and sends the protection switching request message on the link protection tunnel T1.

When the node A and the node B respectively receive the protection switching request message sent by each other (the node B and the node A) on the link protection tunnel T1, the link protection switching is performed for both, and no action is performed, and then a protection switching response message is sent on the link protection tunnel.

When the node A and the node B respectively receive the protection switching response message sent by each other (the node B and the node A) on the link protection tunnel T1, no action is performed.

In Embodiment 7 of the present invention, when the faults occur in the bidirectional links between the node A and the node B, the node A and the node B respectively switch the services to the link protection tunnel, and send the protection switching request message on the link protection tunnel so that the other end of the link protection tunnel knows that the services need to be switched to the link protection tunnel, so as to ensure normal service transmission.

Embodiment 8

Referring to FIG. 2, Embodiment 8 of the present invention provides a ring network protection method. It is assumed that a fault occurs in a node B in the method, a node A and a node C detect the fault and, and respectively send a protection switching request message on a node protection link in the method, the method includes the following.

The node A detects the fault on a link protection tunnel T1, detects that no fault occurs in a node protection tunnel T3, selects the node protection tunnel T3 to perform protection switching, and sends the protection switching request message on the node protection tunnel T3. The node C detects the fault on a link protection tunnel T2, detects that no fault occurs in the node protection tunnel T3, selects the node protection tunnel T3 to perform the protection switching, and sends the protection switching request message on the node protection tunnel T3.

When the node A and the node C respectively receive the protection switching request message sent by each other (the node C and the node A) on the node protection tunnel T3, the node protection switching is performed for both, and no action is performed, and then the node A and the node C respectively send a protection switching response message on the node protection tunnel T3.

When the node A and the node C respectively receive the protection switching response message sent by each other (the node C and the node A) on the node protection tunnel T3, no action is performed.

In Embodiment 8 of the present invention, when the fault occurs in the node B, the node A and the node C respectively switch services to the node protection tunnel, and send the protection switching request message on the node protection tunnel so that the other end of the node protection tunnel knows that the services need to be switched to the link protection tunnel, so as to ensure normal service transmission.

Embodiment 9

Embodiment 9 of the present invention provides a ring network protection method, where the method includes the following.

A first node sends a protection switching request message on a link protection tunnel of a link between the first node and a second node, and a node protection tunnel of the second node respectively.

A protection switching response message is received on the link protection tunnel of the link between the first node and the second node, or the node protection tunnel of the second node.

Services are switched to the protection tunnel where the protection switching response message is received.

A manner of sending the protection switching request message on the protection tunnel includes, but is not limited to, the following manner: sending an OAM packet on the protection tunnel.

The first node may be the node A in the following embodiments, the second node may be the node B in the following embodiments, and the third node may be the node C in the following embodiments.

In Embodiment 9 of the present invention, the first node sends the protection switching request message on the link protection tunnel and the node protection tunnel respectively, and switches the services to the protection tunnel where the protection switching response message is received, so as to ensure normal service transmission.

Embodiment 10

Referring to FIG. 2, Embodiment 10 of the present invention provides a ring network protection method. In the method, it is assumed that a fault occurs in a unidirectional link from a node A to a node B, and the node B detects the fault and sends a protection switching request message on both a link protection tunnel and a node protection tunnel. The method includes the following.

The node B sends the protection switching request message on a link protection tunnel T1 and a node protection tunnel T4.

An intermediate node on the link protection tunnel T1 and the node protection tunnel T4 receives the protection switching request message, and forwards the protection switching request message to a next node in the same processing manner as the processing manner after receiving a common data packet or a control protocol.

A node H receives the protection switching request message on the node protection tunnel T4, and detects that no fault occurs in the network from the node H to the node A, and no action is performed.

The node A receives the protection switching request message on the link protection tunnel T1, selects the link protection tunnel T1 to perform protection switching, and sends a protection switching response message through the link protection tunnel T1.

The node B receives the protection switching response message sent by the node A on the link protection tunnel T1, and selects the link protection tunnel T1 to perform the protection switching.

In Embodiment 10 of the present invention, when the fault occurs in the unidirectional link from the node A to the node B, the node B sends the protection switching request message respectively on the link protection tunnel and the node protection tunnel, and the node A receives the protection switching request message on the link protection tunnel, and then switches services to the link protection tunnel, so as to ensure normal service transmission.

Embodiment 11

Referring to FIG. 2, Embodiment 11 of the present invention provides a ring network protection method. It is assumed that faults occur in bidirectional links between a node A and a node B, and the node A and the node B respectively send a protection switching request message on both a link protection tunnel and a node protection tunnel. The method specifically includes the following.

The node A sends the protection switching request message on a link protection tunnel T1, and meanwhile sends the protection switching request message on a node protection tunnel T3. The node B sends the protection switching request message on the link protection tunnel T1, and meanwhile sends the protection switching request message on a node protection tunnel T4.

The node A and the node B respectively receive the protection switching request message sent by each other (the node B and the node A) on the link protection tunnel T1, select the link protection tunnel T1 to perform the link protection switching, and send the protection switching request message through the link protection tunnel T1.

A node C and a node H respectively receive the protection switching request messages sent by the node A and the node B on the node protection tunnels T3 and T4, but no fault is locally detected on the B-C or A-H side, and therefore no action is performed.

When the node A and the node B respectively receive a protection switching response message sent by each other (the node B and the node A) on the link protection tunnel T1, the link protection switching is performed for both, and no action is performed.

In Embodiment 11 of the present invention, when the faults occur in the bidirectional links between the node A and the node B, both the node A and the node B send the protection switching request message respectively on the link protection tunnel and the node protection tunnel, and an opposite end node (the node B and the node A) of the link protection tunnel receives the protection switching request message on the link protection tunnel and then switches services to the link protection tunnel, so as to ensure normal service transmission.

Embodiment 12

Referring to FIG. 2, Embodiment 12 of the present invention provides a ring network protection method. It is assumed that a fault occurs in a node B in the method, a node A and a node C detect the fault and both a node A and a node C detect the fault and send a protection switching request message respectively on a link protection tunnel and a node protection link. The method specifically includes the following.

The node A sends the protection switching request message on a link protection tunnel T1, and meanwhile sends the protection switching request message on a node protection tunnel T3. The node C sends the protection switching request message on a link protection tunnel T2, and meanwhile sends the protection switching request message on the node protection tunnel T3.

The node A and the node C respectively receive the protection switching request message sent by each other (the node C and the node A) on the node protection tunnel T3, detect the fault on the A-B or the C-B side locally, and then select the node protection tunnel T3 to perform the link protection switching on the current side, and send a protection switching response message through the node protection tunnel T3.

When the node A and the node C respectively receive the protection switching response message sent by each other (the node C and the node A) on the node protection tunnel T3, the node protection switching is performed for both, and no action is performed.

In Embodiment 12 of the present invention, when the fault occurs in the node B between the node A and the node C, the node A and the node C send the protection switching request message respectively on the link protection tunnel and the node protection tunnel, and an opposite end node (the node C and the node A) of the node protection tunnel receives the protection switching request message on the node protection tunnel, and then switches services to the node protection tunnel, so as to ensure normal service transmission.

It should be noted that, the protection switching request message and the protection switching response message in Embodiment 12 of the present invention may but is not limited to use an OAM packet of a digital plane, and a protocol packet of a control plane or other packets may also be used, which does not affect the implementation of the present invention.

Embodiment 13

Figure 6:
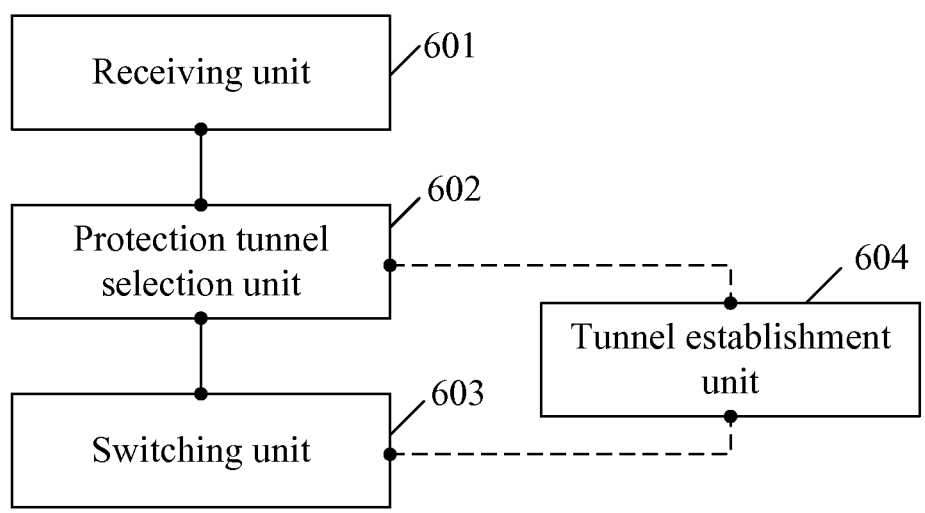
FIG. 6 is an architecture diagram of a network node according to Embodiment 13 of the present invention.

Referring to FIG. 6, Embodiment 13 of the present invention provides a network node, which includes a number of units. A receiving unit 601 is configured to receive a ring network protection switching request message. The ring network protection switching request message carries source and destination node information of the ring network protection switching request message. A protection tunnel selection unit 602 is configured to determine a fault location of the ring network according to the source and destination node information, and to select a protection tunnel according to the determined fault location of the ring network, where the selected protection tunnel is a link protection tunnel of a link between the source node and the network node, or a node protection tunnel of an intermediate node on a short way between the source node and the network node. A switching unit 603 is configured to switch services to the selected protection tunnel.

Specifically, the protection tunnel selection unit 602 is configured to determine a link fault between the network node and the source node when the network node is the destination node; select the link protection tunnel between the network node and the source node; determine a fault of the intermediate node on the short way between the network node and the source node, when the network node is not the destination node and it is detected that a fault occurs on the short way side between the network node and the source node; and select the node protection tunnel of the intermediate node.

The network node further includes: a tunnel establishment unit 604, configured to establish the link protection tunnel of the link between the source node and the network node, or establish the node protection tunnel of the intermediate node on the short way between the source node and the network node.

In Embodiment 13 of the present invention, after receiving the ring network protection switching request message, the network node determines the fault location of the ring network according to the received protection switching request message, selects the protection tunnel (the selected protection tunnel is the link protection tunnel of the link between the network node and the source node, or the node protection tunnel of the intermediate node on the short way between the network node and the source node) according to the fault location of the ring network, and switches the services to the selected protection tunnel to ensure normal service transmission.

Embodiment 14

Figure 7:
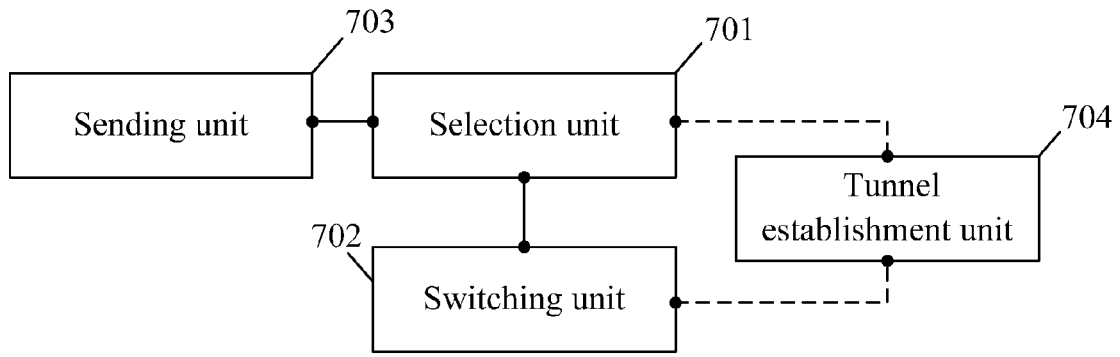
FIG. 7 is an architecture diagram of a network node according to Embodiment 14 of the present invention.

Referring to FIG. 7, Embodiment 14 of the present invention provides a network node, which includes a number of units. A selection unit 701 is configured to select a protection tunnel according to a fault condition of a pre-established protection tunnel. A switching unit 702, configured to switch services to the selected protection tunnel. A sending unit 703, configured to send a protection switching request message on the selected protection tunnel.

Specifically, the selection unit 701 is configured to detect whether a fault occurs in the link protection tunnel of a link between the network node and a second node; if the fault does not occur, select the link protection tunnel of the link between the network node and the second node, and if the fault occurs, and no fault occurs in the node protection tunnel of the second node, select the node protection tunnel of the second node.

The network node further includes a tunnel establishment unit 704, which configured to establish the link protection tunnel of the link between the network node and the second node, or establish the node protection tunnel of the second node.

In Embodiment 14 of the present invention, the network node selects the protection tunnel according to a fault state of the pre-established protection tunnel, and sends the protection switching request message on the selected protection tunnel so that the other end of the protection tunnel learns that the services need to be switched to the protection tunnel, so as to ensure normal service transmission.

Embodiment 15

Figure 8:
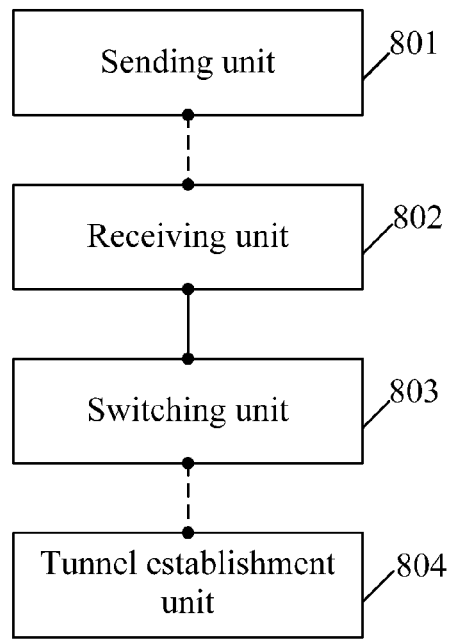
FIG. 8 is an architecture diagram of a network node according to Embodiment 15 of the present invention.

Referring to FIG. 8, Embodiment 15 of the present invention provides a network node, which includes a number of units. A sending unit 801 is configured to send a protection switching request message on a link protection tunnel of a link between the network node and a second node, and a node protection tunnel of the second node respectively. A receiving unit 802, configured to receive a protection switching response message on the link protection tunnel of the link between the network node and the second node, or the node protection tunnel of the second node. A switching unit 803, configured to switch services to the protection tunnel where the protection switching response message is received.

The network node further includes: a tunnel establishment unit 804, configured to establish the link protection tunnel of the link between the network node and the second node, or establish the node protection tunnel of the second node.

In Embodiment 15 of the present invention, the network node sends the protection switching request message respectively on two protection tunnels, and switches the services to the protection tunnel where the protection switching response message is received, so as to ensure normal service transmission.

Embodiment 16

Embodiment 16 of the present invention provides a ring network, which includes first and second nodes. A node 1 is configured to detect a network fault, and send a ring network protection switching request message to a node 2. The protection switching request message carries source and destination node information of the ring network protection switching request message. The node 2 is configured to determine a fault location of the ring network according to the source and destination node information, to select a protection tunnel according to the determined fault location of the ring network, and to switch services to the selected protection tunnel. The selected protection tunnel is a link protection tunnel of a link between the node 2 and the node 1, or a node protection tunnel of an intermediate node on a short way between the node 2 and the node 1.

In Embodiment 16 of the present invention, after the node 2 in the ring network receives the ring network protection switching request message, the node 2 determines the fault location of the ring network according to the ring network protection switching request message, selects the protection tunnel according to the fault location of the ring network, and switches the services to the selected protection tunnel, so as to ensure normal service transmission.

Embodiment 17

Embodiment 17 of the present invention provides a ring network, which includes: a first node, a second node and a third node, where the second node is adjacent to the first node and the third node respectively.

The first node is configured to select a protection tunnel according to a fault condition of a pre-established protection tunnel, switch services to the selected protection tunnel, and send a protection switching request message on the selected protection tunnel, where the selected protection tunnel is a link protection tunnel of a link between the first node and the second node or a node protection tunnel of the second node.

The second node is configured to switch the services to the link protection tunnel of the link between the first node and the second node if the protection switching request message is received on the link protection tunnel of the link between the first node and the second node.

The third node is configured to switch the services to the node protection tunnel of the second node if the protection switching request message is received on the node protection tunnel of the second node.

In Embodiment 17 of the present invention, the first node in the ring network selects the protection tunnel according to a fault state of the pre-established protection tunnel, and sends the protection switching request message on the selected protection tunnel so that the other end of the protection tunnel learns that the services need to be switched to the protection tunnel, so as to ensure normal service transmission.

Embodiment 18

Embodiment 18 of the present invention provides a ring network, which includes: a first node, a second node and a third node, where the second node is adjacent to the first node and the third node respectively.

The first node is configured to send a protection switching request message respectively on a link protection tunnel of a link between the first node and the second node, and a node protection tunnel of the second node; receive a protection switching response message on the link protection tunnel of the link between the first node and the second node, or the node protection tunnel of the second node; and switch services to the protection tunnel where the protection switching response message is received.

The second node is configured to switch the services to the link protection tunnel of the link between the first node and the second node, and send the protection switching response message on the link protection tunnel of the link between the first node and the second node, if the protection switching request message is received on the link protection tunnel of the link between the first node and the second node.

The third node is configured to switch the services to the node protection tunnel of the second node, and send the protection switching response message on the node protection tunnel of the second node, if the protection switching request message is received on the node protection tunnel of the second node and it is detected that a fault occurs on a short way side between the end node and the first node.

In Embodiment 18 of the present invention, the first node in the ring network sends the protection switching request message respectively on two protection tunnels, and switches the services to the protection tunnel where the protection switching response message, so as to ensure normal service transmission is received.

Those of ordinary skill in the art should understand that all or a part of the steps of the method according to the embodiments of the present invention may be implemented by means that a program instructs relevant hardware. The program may be stored in a computer readable storage medium, for example, a read-only memory (ROM), a magnetic disk or an optical disk.

The ring network protection method, the network node and the ring network are described in detail above through the embodiments of the present invention. The principle and implementation of the present invention are described herein through specific examples. The description of the embodiments of the present invention is merely provided for easy understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A ring network protection method, comprising:
when a fault occurs in a ring network, selecting, by a first node, a protection tunnel according to a fault condition of a pre-established protection tunnel;
switching services to the selected protection tunnel; and
sending a protection switching request on the selected protection tunnel so as to inform another end node of the selected protection tunnel to switch the services to the selected protection tunnel;
wherein selecting the protection tunnel comprises detecting whether the fault occurs in a link protection tunnel of a link between the first node and a second node, and
if the fault does not occur in the link protection tunnel of the link, the link protection tunnel of the link between the first node and the second node is selected, and
if the fault occurs in the link protection tunnel of the link and no fault occurs in a node protection tunnel of the second node, the node protection tunnel of the second node is selected.

2. The method according to claim 1, further comprising:
for each node in the ring network, establishing a node protection tunnel for the node, wherein the node protection tunnel connects two adjacent nodes of the node; and
for each link in the ring network, establishing a link protection tunnel for the link, wherein the link protection tunnel connects two end nodes of the link.

3. A node located in a ring network, the node comprising:
a selection unit, configured to select a protection tunnel according to a fault condition of a pre-established protection tunnel when a fault occurs in the ring network;
a switching unit, configured to switch services to the selected protection tunnel; and
a sending unit, configured to send a protection switching request on the selected protection tunnel,
wherein the selection unit is configured to select a link protection tunnel of a link between the node and a second node if it is determined that the fault does not occur in the link protection tunnel and select a node protection tunnel of the second node if it is determined that the fault occurs in the link protection tunnel and no fault occurs in the node protection tunnel.

4. The node according to claim 3, further comprising a tunnel establishment unit, which is configured to establish the selected protection tunnel of the link between the node and the second node.

5. The node according to claim 3, further comprising a tunnel establishment unit, which is configured to establish the node protection tunnel of the second node.

6. The node according to claim 3, further comprising a tunnel establishment unit, which is configured to establish the selected protection tunnel of the link between the node and a second node or a node protection tunnel of the second node.

7. A ring network, comprising:
a first node;
a second node; and
a third node, wherein the second node is adjacent to the first node and the third node, respectively;
wherein the first node is configured to select a protection tunnel according to a fault condition of a pre-established protection tunnel when a fault occurs in the ring network, to switch services to the selected protection tunnel, to send a protection switching request on the selected protection tunnel, wherein the selected protection tunnel is a link protection tunnel of a link between the first node and the second node or a node protection tunnel of the second node;
wherein the second node is configured to switch the services to the link protection tunnel of the link between the first node and the second node if the protection switching request is received on the link protection tunnel of the link between the first node and the second node; and
wherein the third node is configured to switch the services to the node protection tunnel of the second node if the protection switching request is received on the node protection tunnel of the second node.

8. The ring network according to claim 7, wherein the selected protection tunnel is the link protection tunnel of a link between the first node and the second node.

9. The ring network according to claim 7, wherein the selected protection tunnel is the node protection tunnel of the second node.

10. A node located in a ring network, the node comprising a computer including a non-transitory computer-readable medium storing program modules executable by the computer, the modules including:
- a selection module, configured to select a protection tunnel according to a fault condition of a pre-established protection tunnel when a fault occurs in the ring network;
- a switching module, configured to switch services to the selected protection tunnel; and
- a sending module, configured to send a protection switching request on the selected protection tunnel,
- wherein the selection module is configured to select a link protection tunnel of a link between the node and a second node if it is determined that the fault does not occur in the link protection tunnel and select a node protection tunnel of the second node if it is determined that the fault occurs in the link protection tunnel and no fault occurs in the node protection tunnel.

11. The node according to claim 10, wherein the modules further include a tunnel establishment module, which is configured to establish the selected protection tunnel of the link between the node and the second node.

12. The node according to claim 10, the modules further include a tunnel establishment module, which is configured to establish the node protection tunnel of the second node.

13. The node according to claim 10, the modules further include a tunnel establishment module, which is configured to establish the selected protection tunnel of the link between the node and a second node or a node protection tunnel of the second node.

* * * * *